United States Patent Office 3,336,355
Patented Aug. 15, 1967

3,336,355
URETHANES OF TRIARYLACRYLONITRILES
Robert Edward Allen, Walnut Creek, and Laszlo Ambrus, Berkeley, Calif., assignors to Cutter Laboratories Inc., Berkeley, Calif., a corporation of Delaware
No Drawing. Filed July 2, 1964, Ser. No. 380,083
14 Claims. (Cl. 260—465)

The present inveniton relates to novel urethane compounds and is more particularly concerned with urethanes of triarylacrylonitriles, a method for their preparation, compositions incorporating the novel compounds, and a method of treatment utilizing the active compounds of the invention and compositions containing the same.

The novel compounds of the present invention may be represented by the formula:

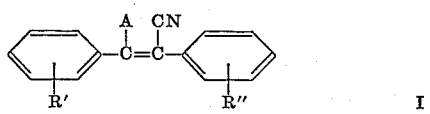

wherein R' and R" are independently selected from the group consisting of hydrogen, lower-alkyl, lower-alkoxy, halogen, trifluoromethyl, dilower-alkylamino, hydroxy, and carbamoyloxy

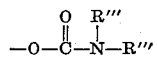

hereinafter written —OCONR'''R''', in which the two R''' groups are independently selected from the group consisting of hydrogen, lower-alkyl, and A, and together with the nitrogen atom may represent piperidino, pyrrolidino, morpholino, piperazino, N-lower-alkyl-piperazino, or mono and poly C-lower-alkyl derivatives thereof, at least one of R' and R" being carbamoyloxy, and wherein A has the formula

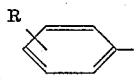

in which R is selected from the group consisting of hydrogen, lower-alkyl, lower-alkoxy, halogen, trifluoromethyl, and dilower-alkylamino. The compounds of the invention can exist as cis or trans geometric isomers, and such isomers are within the scope of the invention as well as the isomer mixtures.

Throughout the specification and claims, the terms lower-alkyl, lower-alkoxy, and dilower-alkylamino refer to the respective groups having up to eight carbon atoms inclusive in each lower-alkyl radical thereof. Such groups having up to a maximum of four carbon atoms in each lower-alkyl radical are preferred.

The compounds of the foregoing formula are characterized by gonadotrophic inhibitory and uterotrophic activity, and are accordingly useful in the treatment of conditions involving fertility and sterility problems in both males or females, especially those conditions arising from or subject to influence by female or male harmonal imbalance. The compounds are also useful as herbicides and insecticides.

The compounds of the invention are prepared by reacting a phenolic hydroxy-containing triphenylacrylonitrile with an isocyanate, cyanic acid (HNCO), or a carbamyl halide, or with individual components ultimately providing the same groups as a carbamyl halide, for example phosgene and an amine.

The hydroxy-containing triphenylacrylonitrile starting materials have the following general structure:

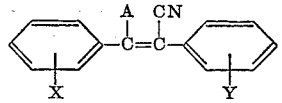

wherein X and Y are independently selected from the group consisting of hydrogen, lower-alkyl, lower-alkoxy, halogen, trifluoromethyl, dilower-alkylamino, and hydroxy, at least one of X and Y being hydroxy, and wherein A has the value given hereinbefore.

This starting material may in some cases also be used in the form of its sodium or other alkali metal or alkaline earth metal salt. Examples 12 and 13 are illustrative of such procedure.

The hydroxy-containing triphenylacrylontrile starting materials may be conveniently prepared by demethylation of a corresponding methoxy-substituted triphenylacrylonitrile by means of pyridine hydrochloride, preferably at the reflux temperature for pyridine hydrochloride, or by decomposition of a 2-tetrahydropyranyl ether derivative of the phenol by means of an aqueous acid such as dilute hydrochloric or sulfuric acid or the like. The latter method is preferable, particularly when one desires to obtain a phenolic intermediate where another non-phenolic phenyl group carries an alkoxy substituent. The methyl or tetrahydropyranyl ether intermediates are conveniently prepared by the condensation of a suitably substituted benzophenone with an appropriately substituted phenylacetonitrile. The condensation may be effected in inert solvents such as diethylether, benzene, toluene, dimethylformamide, or any combination of these, preferably at their reflux temperatures, using a basic catalyst such as sodium or potassium or lithium amide, hydride, or the metals themselves in a finely divided state in a solvent such as toluene or xylene.

The second starting material is selected from the group consisting of (a) R'''—N=C=O, (b) R'''R'''—N—CO—Cl and (c) a combination of phosgene (COCl₂) and HNR'''R''', wherein R''' in (a) is selected from the group consisting of hydrogen, lower-alkyl and A, and the two R''' groups in (b) and (c) are independently selected from the group consisting of hydrogen, lower-alkyl, and A, in which A has the value given hereinbefore, and together with the N may be pyrrolidino, piperidino, morpholino, piperazino, N-lower-alkylpiperazino, or a mono- or poly C-lower-alkyl derivative thereof.

It will be recognized that the combination of reactants (c) provides reactant (b) in situ. When the combination of reactants (c) is used, the starting material (II) is first reacted with phosgene and subsequently with the amine.

When a starting material of Formula II is used in which both X and Y are hydroxy groups, employing an amount of the second starting material less than that required to react completely with both hydroxy groups, only one of the hydroxy groups X and Y reacts and the other appears as R' or R" in the final product of Formula I. When an excess of the second reactant is employed, both hydroxy groups are converted to carbamate groups.

The end product of the reaction is a primary, secondary, or tertiary urethane, as desired, dependent upon the nature of the second starting material. The basic reactions can be illustrated as follows:

*Primary Urethanes*

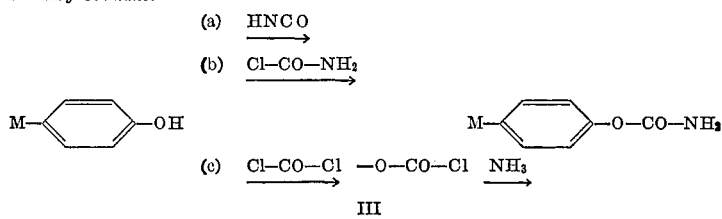

M designating the remainder of the molecule, only the moiety taking part in the reaction being shown in detail.

*Secondary Urethanes*

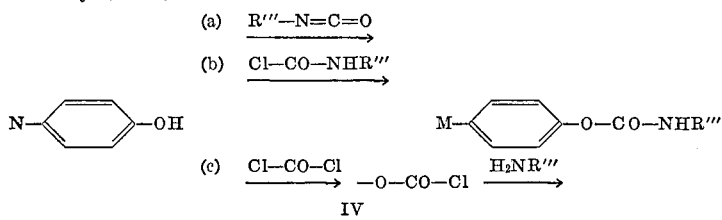

*Tertiary Urethanes*

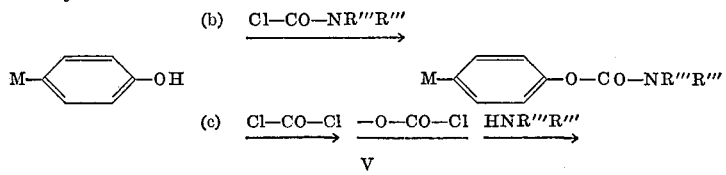

In the formulas given above, the R''' radicals have the values given hereinbefore. The hydroxy group may be in the ortho or meta position rather than para as shown. The chlorine atom may be replaced by other halogen atoms, e.g., bromine. The reaction conditions and procedure are generally conventional. In a preferred embodiment, a lower-alkyl isocyanate in which the lower-alkyl group has up to eight carbon atoms, inclusive, is employed. The reaction is usually carried out in an inert solvent such as benzene, dimethyl-formamide, ether, or the like, or in a combination of solvents, to which has been added a catalytic amount of a tertiary amine base such as pyridine or triethylamine, and at temperatures ranging from about −20 degrees centigrade to reflux temperatures. The reaction solvent is generally removed under reduced pressure upon completion of the reaction, whereafter the crude product is extracted with a suitable solvent, e.g., benzene, the extract filtered and diluted with a lower-hydrocarbon solvent, e.g., hexane, and the product which crystallizes then recrystallized to a desired state of purity. Other conventional procedures for recovery and purification may be used if desired.

The phenolic hydroxy-containing triarylacrylonitriles, most of which are new compounds, are prepared as follows:

PREPARATION 1.—3,3-diphenyl-2-(4-hydroxyphenyl) acrylonitrile

One hundred ten grams (0.61 mole) of benzophenone and 40 grams (0.9 mole) of sodium hydride dispersion (53 percent in mineral oil) are suspended in 300 milliliters of dry benzene. To this stirred suspension, heated to reflux, is added a solution of 90 grams (0.61 mole) of 4-methoxyphenylacetonitrile in 200 milliliters of dry benzene over a one-hour period. The reaction mixture is refluxed four additional hours at the end of which time hydrogen evolution has practically ceased. The reaction mixture is kept at room temperature for sixteen hours and the excess hydride cautiously decomposed with water. The organic layer is washed several times with water, dried over anhydrous magnesium sulfate, filtered, and the solvent removed under reduced pressure. The residue is taken up in a minimum amount of hot ethanol. 3,3-diphenyl-2-(4-methoxyphenyl)-acrylonitrile is obtained as yellow needles melting at about 148–149° centigrade.

Ninety grams (0.29 mole) of 3,3-diphenyl-2-(4-methoxyphenyl)acrylonitrile and 126 grams (1.1 moles) of pyridine hydrochloride are refluxed for thirty minutes. The reaction mixture is cooled and diluted with water. The crude material is filtered and dissolved in one liter of five percent warm sodium hydroxide solution, the solution is filtered, and the filtrate is acidified with one liter of five percent hydrochloric acid. The precipitate is filtered and dissolved in a minimum amount of hot ethanol. 3,3-diphenyl-2-(4-hydroxyphenyl)acrylonitrile is obtained as yellow crystals melting at about 229–230° centigrade.

*Analysis.*—Calculated for $C_{21}H_{15}NO$: C, 84.80; H, 5.08; N, 4.71. Found: C, 85.00; H, 4.61; N, 4.57.

This compound can also be obtained by acid decomposition of 3,3-diphenyl-2-[4-(tetrahydropyran-2-yloxy) phenyl]-acrylonitrile which is prepared by the condensation of benzophenone with 4-(tetrahydropyran-2-yloxy) phenylacetonitrile (procedure of Preparation 3) to give 3,3 - diphenyl - 2 - [4 - tetrahydropyran-2-yloxy)phenyl]-acrylonitrile, melting at about 143–144° centigrade. The compound has uterotrophic and gonadotrophic inhibitory activity.

*Analysis.*—Calculated for $C_{26}H_{23}NO_2$: C, 81.86; H, 6.08; N, 3.67. Found: C, 81.60; H, 6.08; N, 3.69.

PREPARATION 2.—2-(4-hydroxyphenyl-3,3-bis(4-tolyl)acrylonitrile

By the procedure described in Preparation 1, 4,4'-dimethylbenzophenone is allowed to react with 4-methoxyphenylacetonitrile to give 2-(4-methoxyphenyl)-3,3-bis(4-tolyl)acrylonitrile, yellow crystals when crystallized from isopropanol, melting at about 146–148° centigrade.

*Analysis.*—Calculated for $C_{24}H_{21}NO$: C, 84.95; H, 6.23; N, 4.12. Found: C, 84.52; H, 6.76; N, 3.91.

By treating 2-(4-methoxyphenyl)-3,3-bis(4-tolyl)acrylonitrile with pyridine hydrochloride according to the procedure of Preparation 1, 2-(4-hydroxyphenyl)-3,3-bis(4-tolyl)acrylonitrile is obtained as yellow crystals melting at about 229–230° centigrade.

*Analysis.*—Calculated for $C_{23}H_{19}NO$: C, 84.90; H, 5.88; N, 4.31. Found: C, 84.74; H, 5.69; N, 4.70.

PREPARATION 3.—2-(4-hydroxyphenyl)-3,3-bis(4-methoxyphenyl)acrylonitrile

A mixture of 160 grams (1.2 moles) of 4-hydroxyphenylacetonitrile and 103 grams (1.3 moles) of dihydropyran is dissolved in 500 milliliters of dry benzene and two milliliters of concentrated hydrochloric acid added. The reaction mixture is refluxed for four hours and kept at room temperature for sixteen hours. The organic layer is washed several times with 200-milliliter portions of five percent sodium hydroxide solution and with water until neutral. The organic layer is dried over magnesium sulfate, filtered, and the solvent removed under reduced pressure. The oily residue is crystallized from an ether-pentane (1 to 3) mixture to give 4-(tetrahydropyran-2-yloxy) phenylacetonitrile, yellow crystals melting at about 64–66° centigrade.

To a refluxing suspension of 70 grams (1.8 moles) of sodium amide and 150 milliliters of benzene is added a solution of 154 grams (0.72 mole) of 4-(tetrahydropyran-2-xyloxy)phenylacetonitrile in 500 milliliters of dry benzene over a three-hour period. The reaction mixture is refluxed for one additional hour at the end of which time the ammonia evolution has practically ceased. With stirring, a hot solution of 174 grams (0.72 mole) of 4,4'-dimethoxybenzophenone in two liters of benzene is added. After two additional hours at reflux, the reaction mixture is kept at room temperature for sixteen hours and the excess sodium amide is cautiously decomposed with water. The organic layer is washed several times with water, dried over anhydrous magnesium sulfate, filtered, and the solvent removed under reduced pressure. The oily residue is triturated with a warm mixture of one liter ethanol and 500 milliliters of petroleum ether (B.P. 60–68° centigrade) from which a yellow solid, melting at about 202–206° centigrade, is obtained by evaporation. This solid is dissolved in 500 milliliters of boiling glacial acetic acid containing three drops of concentrated sulfuric acid and slowly diluted with water until yellow needles separate (about 800 milliliters of water is needed). 2-(4-hydroxyphenyl)-3,3-bis(4-methoxyphenyl)acrylonitrile is obtained as yellow crystals melting at about 217–219° centigrade.

*Analysis.*—Calculated for $C_{23}H_{19}NO_3$: C, 77.29; H, 5.36; N, 3.92. Found: C, 77.38; H, 5.34; N, 3.81.

PREPARATION 4.—3,3-bis(4-chlorophenyl)-2-(4-hydroxyphenylacrylonitrile

By the procedure described in Preparation 3, 4,4'-dichlorobenzophenone is allowed to react with 4-(tetrahydropyran-2-yloxy)phenylacetonitrile to give 3,3-bis(4-chlorophenyl)-2-(4-hydroxyphenyl)acrylonitrile, yellow crystals when crystallized from acetic acid, melting at about 252–254° centigrade.

*Analysis.*—Calculated for $C_{21}H_{13}Cl_2NO$: C, 68.88; H, 3.58; N, 3.82. Found: C, 68.80; H, 3.58; N, 3.85.

PREPARATION 5.—2,3-diphenyl-3-(4-hydroxyphenyl)-acrylonitrile

A mixture of 100 grams (0.505 mole) of 4-hydroxybenzophenone and 50 grams (0.595 mole) of dihydropyran is dissolved in 500 milliliters of warm dry benzene and two milliliters of concentrated hydrochloric acid is added. The reaction mixture is refluxed for four hours and then kept at room temperature for sixteen hours. The organic layer is washed several times with 200-milliliter portions of five percent sodium hydroxide solution and with water until neutral. The organic layer is dried over magnesium sulfate, filtered, and the solvent removed under reduced pressure to give a yellow oil, which is dissolved in pentane to give white crystals of 4-(tetrahydropyran-2-yloxy)benzophenone, melting at about 49–51° centigrade.

*Analysis.*—Calculated for $C_{18}H_{18}O_3$: C, 76.60; H, 6.43. Found: C, 76.65; H, 6.44.

To a refluxing suspension of eight grams (0.205 mole) of sodium amide in 200 milliliters of diethyl ether is added a solution of 11.4 grams (0.1 mole) of phenylacetonitrile in 200 milliliters of diethyl ether over a two-hour period. The reaction mixture is refluxed for one additional hour, at the end of which time ammonia evolution has practically ceased. With stirring, a solution of 28 grams (0.1 mole) of 4-(tetrahydropyran-2-yloxy)-benzophenone in 100 milliliters of diethyl ether is added. After two additional hours reflux, the reaction mixture is kept at room temperature for sixteen hours and excess sodium amide is cautiously decomposed with water. The organic layer is washed several times with water, dried over anhydrous magnesium sulfate, filtered, and the solvent removed under reduced pressure. The residual oil is dissolved in methanol from which white crystals of 2,3-diphenyl - 3-[4-(tetrahydropyran-2-yloxy)phenyl]acrylonitrile separate, melting over a range from 118 to 144° centigrade. The compound has uterotrophic and gonadotrophic inhibitory activities.

*Analysis.*—Calculated for $C_{26}H_{23}NO_2$: C, 81.86; H, 6.08; N, 3.67. Found: C, 82.15; H, 6.25; N, 3.87.

These crystals are dissolved in 100 milliliters of boiling glacial acetic acid containing three drops of concentrated sulfuric acid and slowly diluted with water until yellow needles separate (about 250 milliliters of water is needed). 2,3-diphenyl-3-(4-hydroxyphenyl)acrylonitrile is obtained as yellowish crystals melting at about 207–208° centigrade.

PREPARATION 6.—3-(4-hydroxyphenyl)-2-(4-methoxyphenyl)-3-phenylacrylonitrile

By the procedure described in Preparation 5, 4-(tetrahydropyran-2-yloxy)benzophenone is allowed to react with 4-methoxyphenylacetonitrile to give 3-(4-hydroxyphenyl)-2-(4-methoxyphenyl)-3-phenylacrylonitrile, yellowish crystals when crystallized from acetic acid, melting at about 189–191° centigrade.

*Analysis.*—Calculated for $C_{22}H_{17}NO_2$: C, 80.73; H, 5.24; N, 4.28. Found: C, 80.10; H, 5.32; N, 4.46.

PREPARATION 7.—2-(4-chlorophenyl)-3-(4-hydroxyphenyl)-3-phenylacrylonitrile

By the procedure described in Preparation 5, 4-(tetrahydropyran-2-yloxy)benzophenone is allowed to react with 4-chlorophenylacetonitrile. The ether is removed and the reaction mixture is extracted with hexane from which a crop of crystals separate. These are recrystallized from ethanol to give one of the geometric forms of 2-(4-chlorophenyl) - 3-phenyl-3-[4-(tetrahydropyran-2-yloxy)phenyl]acrylonitrile, melting at about 183–184° centigrade.

*Analysis.*—Calculated for $C_{26}H_{22}ClNO_2$: C, 75.10; H, 5.33; N, 3.37. Found: C, 75.00; H, 5.42; N, 3.43.

The oily residue from the above hexane mother liquor and the crystals of tetrahydropyranyl derivative are treated separately in glacial acetic acid to give the two geometric forms of 2-(4-chlorophenyl)-3-(4-hydroxyphenyl)-3-phenylacrylonitrile, melting at about 175–177° and 187–189° centigrade, respectively.

*Analysis.*—Calculated for $C_{21}H_{14}ClNO$: C, 76.03; H, 4.25; N, 4.22. Found, respectively: C, 76.18; H, 4.29; N, 4.11; C, 76.07; H, 4.62; N, 4.12.

PREPARATION 8.—3,3-bis(4-dimethylaminophenyl)-2-(4-hydroxyphenyl)acrylonitrile

By the procedure described in Preparation 3, 4,4'-bis-(dimethylamino)benzophenone is allowed to react with 4-(tetrahydropyran-2-yloxy)phenylacetonitrile to give 3,3 - bis(4 - dimethylaminophenyl)-2-[4-(tetrahydropyran-2-yloxy)phenyl]acrylonitrile, yellow crystals when crystallized from dimethylformamide-ethanol (1:20), melting at about 189–191° centigrade.

*Analysis.*—Calculated for $C_{30}H_{33}N_3O_2$: C, 77.05; H, 7.11; N, 8.99. Found: C, 76.82; H, 7.23; N, 8.88.

The tetrahydropyranyl derivative dissolved in dimethylformamide is decomposed with excess 30 percent sulfuric acid and, upon neutralization with diethylamine, orange crystals of 3,3-bis(4-dimethylaminophenyl)-2-(4-hydroxyphenyl)acrylonitrile are obtained, melting at about 240–242° centigrade.

Analysis.—Calculated for $C_{25}H_{25}N_3O$: C, 78.29; H, 6.57; N, 10.95. Found: C, 77.80; H, 6.76; N, 10.78.

PREPARATION 9.—2,3-bis(4-hydroxyphenyl)-3-phenylacrylonitrile

By the procedure described in Preparation 5, 4-(tetrahydropyran-2-yloxy)benzophenone is allowed to react with 4-(tetrahydropyran-2-yloxy)phenyl acetonitrile. The ether is removed and the reaction mixture is dissolved in ethanol, from which a crop of crystals separate. These are recrystallized from dimethylformamide to give one of the geometric forms of 3-phenyl-2,3-bis[4-(tetrahydropyran-2-yloxy)phenyl]-acrylonitrile, melting at about 189–191° centigrade.

Analysis.—Calculated for $C_{31}H_{31}NO_4$: C, 77.31; H, 6.49; N, 2.91. Found: C, 76.75; H, 6.68; N, 3.28.

The oily residue from the above ethanol mother liquor and the crystals of the tetrahydropyranyl derivative are treated separately in glacial acetic acid to give the two geometric forms of 2,3-bis(4-hydroxyphenyl)-3-phenylacrylonitrile, melting at about 263–264° and 261–262° centigrade, respectively.

Analysis.—Calculated for $C_{21}H_{15}NO_2$: C, 80.51; H, 4.83; N, 4.47. Found, respectively: C, 80.20; H, 4.96; N, 4.31; C, 80.56; H, 4.98; N, 4.22.

PREPARATION 10: 2,3-diphenyl-3-(2-hydroxyphenyl)-acrylonitrile

Using 2-hydroxybenzophenone in place of 4-hydroxybenzophenone in the procedure of Preparation 5, 2,3-diphenyl-3-(2-hydroxyphenyl)acrylonitrile is obtained as yellow crystals.

PREPARATION 11: 2-(4-hydroxyphenyl)-3,3-bis(4-trifluoromethylphenyl)acrylonitrile By the procedure described in Preparation 1, 4,4'-bis-(trifluoromethyl)benzophenone is allowed to react with 4-methoxyphenylacetonitrile to give 2-(4-methoxyphenyl)-3,3-bis(4-trifluoromethylphenyl)acrylonitrile.

By treating 2-(4-methoxyphenyl)-3,3-bis(4-trifluoromethylphenyl)acrylonitrile with pyridine hydrochloride according to the procedure of Preparation 1, 2-(4-hydroxyphenyl)-3,3-bis(4-trifluoromethyl)acrylonitrile is obtained.

Where the foregoing preparations produce a compound having a methyl or other lower-alkyl group, it is to be understood that compounds containing other lower-alkyl groups of straight or branched nature and containing up to eight carbon atoms inclusive, such as methyl, ethyl, propyl, isopropyl, butyl, sec.-butyl, t.-butyl, amyl, isoamyl, hexyl, heptyl, and octyl, are prepared in the same manner by substitution in the process of the appropriate different lower-alkyl starting material. Likewise, where chloro or other halogen atom is present, although chlorine is preferred, further halogen compounds including iodo, bromo, chloro, and fluoro compounds are prepared starting from the appropriate halogenated starting material. Similarly, where methoxy or other lower-alkoxy group is present, other lower-alkoxy groups containing various lower-alkyl groups having up to eight carbon atoms inclusive are prepared in the same manner from the appropriate different lower-alkoxy starting material. Moreover, when one dilower-alkylamino group, such as the dimethylamino group, is present in a compound, other dilower-alkylamino compounds are prepared in the same manner starting only with the selected different dilower-alkylamino compound. In the same manner, ortho and meta substituted compounds are produced instead of the para by utilizing the selected ortho or meta substituted starting compound. Similarly, other molecular changes are readily made.

The following examples are given by way of illustration only and are not to be construed as limiting.

Example 1.—N-methyl 4-(1-cyano-2,2-diphenylvinyl)-phenyl carbamate

Sixteen grams (0.005 mole) of 3,3-diphenyl-2-(4-hydroxyphenyl)acrylonitrile is dissolved in 100 milliliters of dry benzene containing about ten milliliters of dimethyl formamide and about five drops of pyridine. The yellow solution is cooled in an ice bath and 3.4 grams (0.06 mole) of methyl isocyanate in twenty milliliters of ether is added over a twenty-minute period with stirring. The solution is allowed to come to room temperature and remain there for about sixteen hours. The solvents are removed under reduced pressure and the residue taken up in a minimum of hot benzene. The solution is filtered and diluted with about one-fourth its volume of hexane. The white crystalline material formed is re-crystallized from the same solvent to give N-methyl 4-(1-cyano-2,2-diphenylvinyl)-phenyl carbamate as fine, white crystals, melting at about 163–164° centigrade. The compound has gonadotrophic inhibitory, uterotrophic and myotrophic activities.

Analysis.—Calculated for $C_{23}H_{18}N_2O_2$: C, 77.95; H, 5.11; N, 7.91. Found: C, 77.97; H, 4.93; N, 7.83.

Example 2.—N-methyl 4[1-cyano-2,2-bis(4-tolyl)-vinyl]phenyl carbamate

By the procedure described in Example 1, 2-(4-hydroxyphenyl)-3,3-bis(4-tolyl)acrylonitrile is allowed to react with methyl isocyanate to give N-methyl 4-[1-cyano-2,2-bis(4-tolyl)vinyl]phenyl carbamate as greenish-yellow crystals melting at about 185–187° centigrade. The compound has uterotrophic and myotrophic activities.

Analysis.—Calculated for $C_{25}H_{22}N_2O_2$: C, 78.51; H, 5.80; N, 7.33. Found: C, 78.25; H, 6.08; N, 7.23.

Example 3.—N-methyl 4-[2,2-bis(4-chlorophenyl)-1-cyanovinyl]phenyl carbamate

By the procedure described in Example 1, 3,3-bis-(4 - chlorophenyl) - 2 - (4-hydroxyphenyl)acrylonitrile is allowed to react with methyl isocyanate to give N-methyl 4 - [2,2 - bis(4-chlorophenyl)-1-cyanovinyl]phenyl carbamate as off-white crystals melting at about 157–159° centigrade. The compound has gonadotrophic inhibitory and uterotrophic activities.

Analysis.—Calculated for $C_{23}H_{16}Cl_2N_2O_2$: C, 65.26; H, 3.81; N, 6.62. Found: C, 65.32; H, 3.74; N, 6.20.

Example 4.—N-methyl 4-[1-cyano-2,2-bis(4-methoxyphenyl)vinyl]phenyl carbamate

By the procedure described in Example 1, 2-(4-hydroxyphenyl)-3,3-bis(4-methoxyphenyl)acrylonitrile is allowed to react with methyl isocyanate to give N-methyl 4-[1-cyano-2,2-bis(4-methoxyphenyl)vinyl]phenyl carbamate as yellowish crystals melting at about 126–128° centigrade. The compound has uterotrophic and myotrophic activities.

Analysis.—Calculated for $C_{25}H_{22}N_2O_4$: C, 72.45; H, 5.35; N, 6.76. Found: C, 71.60; H, 5.76; N, 6.54.

Example 5.—N-methyl 4-(2-cyano-1,2-diphenylvinyl)phenyl carbamate

By the procedure described in Example 1, 2,3-diphenyl-3-(4-hydroxyphenyl)acrylonitrile is allowed to react with methyl isocyanate to give N-methyl 4-(2-cyano-1,2-diphenylvinyl)phenyl carbamate as yellowish crystals melting at about 189–191° centigrade. The compound has gonadotrophic inhibitory and uterotrophic activities.

Analysis.—Calculated for $C_{23}H_{18}N_2O_2$: C, 77.95; H, 5.12; N, 7.90. Found: C, 78.00; H, 5.58; N, 7.84.

Example 6.—4-(2-cyano-1,2-diphenylvinyl)phenyl carbanilate

By the procedure described in Example 1, 2,3-diphenyl-3-(4-hydroxyphenyl)acrylonitrile is allowed to react with phenyl isocyanate to give 4-(2-cyano-1,2-diphenylvinyl)-phenyl carbanilate as white crystals melting at about 178–180° centigrade. The compound has uterotrophic activity.

Analysis.—Calculated for $C_{28}H_{20}N_2O_2$: C, 80.75; H, 4.84; N, 6.73. Found: C, 81.35; H, 5.15; N, 6.55.

Example 7.—N-methyl 4-[2-cyano-2-(4-methoxyphenyl)-1-phenylvinyl]phenyl carbamate By procedure described in Example 1, 3-(4-hydroxyphenyl)-2-(4-methoxyphenyl) - 3-phenylacrylonitrile is allowed to react with methyl isocyanate to give N-methyl 4-[2-cyano-2-(4-methoxyphenyl) - 1-phenylvinyl]phenyl carbamate as yellowish crystals melting at about 175–179° centigrade. The compound has uterotrophic and gonadotrophic inhibitory activites.

Analysis.—Calculated for $C_{24}H_{20}N_2O_3$: C, 74.98; H, 5.24; N, 7.29. Found: C, 75.55; H, 5.58; N, 7.10.

Example 8.—N-butyl 4-[2-cyano-2-(4-methoxyphenyl)-1-phenylvinyl]phenyl carbamate By the procedure described in Example 1, 3-(4-hydroxyphenyl)-2-(4-methoxyphenyl)-3-phenylacrylonitrile is allowed to react with butyl isocyanate to give N-butyl 4-[2-cyano-2-(4-methoxyphenyl) - 1-phenylvinyl] phenyl carbamate as yellowish crystals melting at about 164–166° centigrade. The compound has uterotrophic and gonadotrophic inhibitory activities.

Analysis.—Calculated for $C_{27}H_{26}N_2O_3$: C, 76.03; H, 6.14; N, 6.57. Found: C, 75.53; H, 6.62; N, 6.61.

Example 9.—N-methyl 4-[2-(4-chlorophenyl)-2-cyano-1-phenylvinyl]phenyl carbamate By the procedure described in Example 1, the two geometric isomers of 2-(4-chlorophenyl)-3-(4-hydroxyphenyl)-3-phenylacrylonitrile are allowed to react separately with methyl isocyanate to give the two geometric isomers of N-methyl 4-[2-(4-chlorophenyl)-2-cyano-1-phenylvinyl]phenyl carbamate as yellow crystals melting at about 105–107° and 158–160° centigrade, respectively.

Analysis.—Calculated for $C_{23}H_{17}ClN_2O_2$: C, 71.05; H, 4.41; N, 7.21. Found, respectively: C, 71.40; H, 4.98; N, 7.02; C, 71.40; H, 4.72; N, 7.11.

Both cis and trans isomers exhibited potent uterotrophic and gonadotrophic-inhibitory activities.

Example 10.—N-propyl 4-(1-cyano-2,2-diphenylvinyl)phenyl carbamate

By the procedure described in Example 1, 3,3-diphenyl-2-(4-hydroxyphenyl)acrylonitrile is allowed to react with propyl isocyanate to give N-propyl 4-(1-cyano-2,2-diphenylvinyl)phenyl carbamate, melting at about 148–150° centigrade. This compound has uterotrophic activity.

Analysis.—Calculated for $C_{25}H_{22}N_2O_2$: C, 78.51; H, 5.80; N, 7.33. Found: C, 78.50; H, 6.28; N, 7.11.

Example 11.—4-(1-cyano-2,2-diphenylvinyl)phenyl carbanilate

By the procedure described in Example 1, 3,3-diphenyl-2-(4-hydroxyphenyl)acrylonitrile is allowed to react with phenyl isocyanate to give 4-(1-cyano-2,2-diphenylvinyl) phenyl carbanilate, melting at about 170–171° centigrade. This compound has uterotrophic and gonadotrophic inhibitory activities.

Analysis.—Calculated for $C_{28}H_{20}N_2O_2$: C, 80.75; H, 4.84; N, 6.73. Found: C, 80.65; H, 4.71; N, 6.82.

Example 12.—4-(1-cyano-2,2-diphenylvinyl)phenyl carbamate

A solution of 3,3-diphenyl-2-(4-hydroxyphenyl)acrylonitrile in dimethylformamide is treated with a molar equivalent of sodium methoxide and then allowed to react with chloroformamide to give 4-(1-cyano-2,2-diphenylvinyl)phenyl carbamate.

Example 13.—N,N-dimethyl-4-(1-cyano-2,2-diphenylvinyl)phenyl carbamate

A solution of 3,3-diphenyl-2-(4-hydroxyphenyl)acrylonitrile in dimethylformamide is treated with a molar equivalent of sodium methoxide and then allowed to react with dimethylcarbamyl chloride to give N,N-dimethyl-4-(1-cyano-2,2-diphenylvinyl)phenyl carbamate, melting at about 185–186° centigrade. This compound has uterotrophic activity.

Analysis.—Calculated $C_{24}H_{20}N_2O_2$: C, 78.24; H, 5.47; N, 7.60. Found: C, 77.84; H, 4.88; N, 7.49.

Example 14.—N-methyl 4-[1-cyano-2,2-bis(4-dimethylaminophenyl]phenyl carbamate By the procedure described in Example 1, 3,3-bis(4-dimethylaminophenyl)-2-(4 - hydroxyphenyl)acrylonitrile is allowed to react with methyl isocyanate to give N-methyl 4-[1-cyano-2,2-bis(4-dimethylaminophenyl)vinyl] phenyl carbamate, as yellow crystals decomposing at about 130–132° centigrade.

Analysis.—Calculated for $C_{27}H_{28}N_4O_2$: C, 73.60; H, H, 6.41; N, 12.72. Found: C, 73.89; H, 6.29; N, 12.58.

Example 15.—2,3-bis[4-(N-methylcarbamoyloxy)phenyl]-3-phenylacrylonitrile

By the procedure described in Example 1, fifteen parts of each of the two geometric isomers of 2,3-bis(4-hydroxyphenyl)-3-phenylacrylonitrile is allowed to react with six parts of methyl isocyanate to give the two geometric isomers of 2,3-bis[4-(N-methylcarbamoyloxy)-phenyl]-3-phenylacrylonitrile as yellow crystals, melting at about 197–199° and 212–214° centigrade, respectively.

Analysis.—Calculated for $C_{25}H_{21}N_3O_4$: C, 70.25; H, 4.95; N, 9.83. Found, respectively: C, 70.19; H, 5.09; N, 9.70; C, 69.98; H, 4.78; N, 9.86.

Both cis and trans isomers exhibited potent uterotrophic and gonadotrophic-inhibitory activities.

Example 16.—N-methyl 2-(2-cyano-1,2-diphenylvinyl)phenyl carbamate

By the procedure described in Example 1, 2,3-diphenyl-3-(2-hydroxyphenyl)acrylonitrile is allowed to react with methyl isocyanate to give N-methyl 2-(2-cyano-1,2-diphenylvinyl)phenyl carbamate.

Example 17.—N-methyl 4-[1-cyano-2,2-bis(4-trifluoromethylphenyl)vinyl]phenyl carbamate By the procedure described in Example 1, 2-(4-hydroxyphenyl)-3,3 - bis(4-trifluoromethylphenyl)acrylonitrile is allowed to react with methyl isocyanate to give N-methyl 4-[1-cyano - 2,2 - bis(4 - trifluoromethylphenyl)vinyl] phenyl carbamate.

Although in this example both R and R′, as designated in the formulae above, are trifluoromethyl, compounds wherein only one, or any other combination of two of R, R′ and R″ are trifluoromethyl, are produced from the corresponding hydroxy-containing starting material.

Where the foregoing examples produce a compound having a methyl or other lower-alkyl group, it is to be understood that compounds containing other lower-alkyl groups of straight or branched nature and containing up to eight carbon atoms inclusive, such as methyl, ethyl, propyl, isopropyl, butyl, sec.-butyl, t.-butyl, amyl, isoamyl, hexyl, heptyl, and octyl, are prepared in the same manner by substitution in the process of the appropriate different lower-alkyl starting material. Likewise, where chloro or other halogen atom is present, although chlorine is preferred, further halogen compounds including iodo, bromo, chloro, and fluoro compounds are prepared starting from the appropriate halogenated starting material. Similarly, where methoxy or other lower-alkoxy group is present, compounds having other lower-alkoxy groups containing various lower-alkyl groups having up to eight carbon atoms inclusive are prepared in the same manner from the appropriate different lower-alkoxy starting material. Moreover, when one dilower-alkylamino group, such as the dimethylamino group, is present in a compound, other dilower-alkylamino compounds are prepared in the same manner starting only with the selected different dilower-alkylamino compound. In the same manner, ortho and meta products are produced instead of the para by utilizing the selected ortho or meta substituted starting material. Similarly, other molecular changes within the scope of the invention are readily made.

The compounds of the invention are generally characterized by the pharmacological activity hereinbefore stated, making them useful in counteracting certain physiological abnormalities in a living animal body. Effective quantities of the pharamacologically active compounds of the invention may be administered to a living animal body in any one of various ways, for example, orally as in capsules or tablets, parenterally in the form of sterile solutions, suspensions, or by pellet implantation, and in some cases intravenously in the form of sterile solutions. Other modes of administration are cutaneously, subcutaneously, bucally, intramuscularly, and intraperitoneally.

Pharmaceutical formulations are usually prepared from a predetermined quantity of one or more of the compounds of the invention, preferably in solid form. Such formulations may take the form of powders, elixirs, solutions, pills, capsules, pellets or tablets, with or without, put preferably with, any one of a large variety of pharmaceutically acceptable vehicles or carriers. When in admixture with a pharmaceutical vehicle or carrier, the active ingredient usually comprises from about 0.01 to about 75 percent, normally from about 0.05 to about 15 percent, by weight of the composition. Carriers such as starch, sugar, talc, commonly used synthetic and natural gums, water, and the like, may be used in such formulations. Binders such as gelatin, and lubricants such as sodium stearate, may be used to form tablets. Disintegrating agents such as sodium bicarbonate may also be included in tablets.

Although relatively small quantities of the active materials of the invention, even as low as 0.1 milligram, may be used in cases of administration to subjects having a relatively low body weight, unit dosages are usually five milligrams or above and preferably twenty-five, fifty, or one-hundred milligrams or even higher, depending of course upon the subject treated and the particular result desired. Broader ranges appear to be one to 500 milligrams per unit dose. The active agents of the invention may be combined for administration with other pharmacologically active agents, such as analgesics, sedatives, tranquilizers, adrenal or progestational or estrogenic steroids or hormones, or the like, or with buffers, antacids or the like, and the proportion of the active agent or agents in the compositions may be varied widely. It is only necessary that the active ingredient of the invention constitute an effective amount, i.e., such that a suitable effective dosage will be obtained consistent with the dosage form employed. Obviously, several unit dosage forms may be administered at about the same time. The exact individual dosages as well as daily dosages in a particular case will of course be determined according to well-established principles.

It is to be understood that the invention is not to be limited to the exact details of operation or exact compounds, compositions, or procedures shown and described, as obvious modifications and equivalents will be apparent to one skilled in the art, and the invention is therefore to be limited only by the scope of the appended claims.

We claim:
1. A triarylacrylonitrile urethane have the formula:

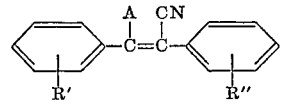

wherein R' and R" are independently selected from the group consisting of hydrogen, lower-alkyl, lower-alkoxy, halogen, trifluoromethyl, dilower-alkylamino, and carbamoyloxy of the formula —OCONR'''R''', in which the two R''' groups are independently selected from the group consisting of hydrogen, lower-alkyl, and A, and taken together with the N, pyrrolidino, piperidino, morpholino, piperazino, N-lower-alkylpiperazino and C-lower-alkyl derivatives thereof, at least one of R' and R" being carbamoyloxy, and wherein A has the formula

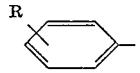

in which R is selected from the group consisting of hydrogen, lower-alkyl, lower-alkoxy, halogen, trifluoromethyl, and dilower-alkylamino.

2. N-lower-alkyl (1 - cyano - 2,2 - diphenylvinyl)phenyl carbamate.

3. N-lower-alkyl (2 - cyano - 1,2 - diphenylvinyl)phenyl carbamate.

4. 2,3 - bis[(N - lower - alkylcarbamoyloxy)phenyl] 3-phenylacrylonitrile.

5. 2,3 - bis[4 - (N - methylcarbamoyloxy)phenyl] - 3-phenylacrylonitrile.

6. N-methyl 4-(1-cyano-2,2-diphenylvinyl)phenyl carbamate.

7. N-methyl 4-[2,2-bis(4-chlorophenyl)-1-cyanovinyl] phenyl carbamate.

8. N - methyl 4-[1-cyano-2,2-bis(4-methoxyphenyl)vinyl]-phenyl carbamate.

9. N-methyl 4-(2-cyano-1,2-diphenylvinyl)phenyl carbamate.

10. 4-(2-cyano-1,2-diphenylvinyl)phenyl carbanilate.

11. N-lower-alkyl 4-[1-cyano-2,2-bis(4-methoxyphenyl)-vinyl]phenyl carbamate.

12. 2,3 - bis - (N - methylcarbamoyloxyphenyl) - 3-phenylacrylonitrile.

13. N-lower-alkyl [2,2-bis(halophenyl)-1-cyanovinyl] phenyl carbamate.

14. N - lower - alkyl [2,2-bis(chlorophenyl)-1-cyanovinyl]phenyl carbamate.

References Cited

UNITED STATES PATENTS 3,226,426  12/1966  Hopkins et al. _____ 260—471

CHARLES B. PARKER, Primary Examiner.

DOLPH H. TORRENCE, Assistant Examiner.

CERTIFICATE OF CORRECTION

Patent No. 3,336,355                                          August 15, 1967

Robert Edward Allen et al.

It is hereby certified that error appears in the above numbered patent requiring correction and that the said Letters Patent should read as corrected below.

Column 1, line 9, for "inveniton" read -- invention --; line 44, for "isomer" read -- isomeric --; column 3, about lines 10 to 13, the left-hand portion of the formula should appear as shown below instead of as in the patent:

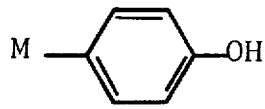

column 4, line 62, for "2-(4-hydroxyphenyl-3,3" read -- 2-(4-hydroxyphenyl)-3,3 --; column 5, line 48, for "hydroxyphenylacrylonitrile" read -- hydroxyphenyl)acrylonitrile --; column 8, line 8, for "(0.005 mole)" read -- (0.05 mole) --; column 10, line 17, for "methylaminophenyl]phenyl" read -- methylaminophenyl)vinyl]phenyl --; line 25, strike out "H,"; column 12, line 8, for "have" read -- having --.

Signed and sealed this 9th day of July 1968.

(SEAL)
Attest:

EDWARD M. FLETCHER, JR.                        EDWARD J. BRENNER
Attesting Officer                                  Commissioner of Patents